(12) United States Patent
Vook et al.

(10) Patent No.: US 7,516,452 B1
(45) Date of Patent: Apr. 7, 2009

(54) METHOD AND SYSTEM FOR MANAGING INSTALLATION OF SOFTWARE ON A COMPUTER SYSTEM PLATFORM

(75) Inventors: Eric R. Vook, Durham, NC (US); J. Brandon Myers, Durham, NC (US); Victor Kan, Morrisville, NC (US); Karl M. Owen, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 682 days.

(21) Appl. No.: 11/095,986

(22) Filed: Mar. 31, 2005

(51) Int. Cl.
*G06F 9/445* (2006.01)
*G06F 9/44* (2006.01)

(52) U.S. Cl. .................. 717/174; 717/175; 717/177; 717/168; 717/169; 717/170; 717/172

(58) Field of Classification Search .................. 717/174, 717/175, 177, 168, 169, 170, 172
See application file for complete search history.

(56) References Cited

U.S. PATENT DOCUMENTS

| 6,182,275 | B1* | 1/2001 | Beelitz et al. | 717/175 |
|---|---|---|---|---|
| 6,389,589 | B1* | 5/2002 | Mishra et al. | 717/170 |
| 7,243,346 | B1* | 7/2007 | Seth et al. | 717/163 |
| 2005/0262076 | A1* | 11/2005 | Voskuil | 707/8 |
| 2006/0143324 | A1* | 6/2006 | Awamoto et al. | 710/14 |
| 2006/0265708 | A1* | 11/2006 | Blanding et al. | 717/174 |

OTHER PUBLICATIONS

Neamtiu, et al. "Practical Dynamic Software Updating for C", 2006, ACM, p. 72-83.*
Suleman, et al. "A Flexible Approach to Web Component Packaging", 2006, Proceedings of SAICSIT, p. 257-266.*

* cited by examiner

*Primary Examiner*—Wei Y Zhen
*Assistant Examiner*—Qamrun Nahar
(74) *Attorney, Agent, or Firm*—Krishnendu Gupta; Robert Kevin Perkins

(57) ABSTRACT

A method, system, or computer program product for controlling software installation that can accommodate revisions of software and hardware platforms over time.

10 Claims, 14 Drawing Sheets

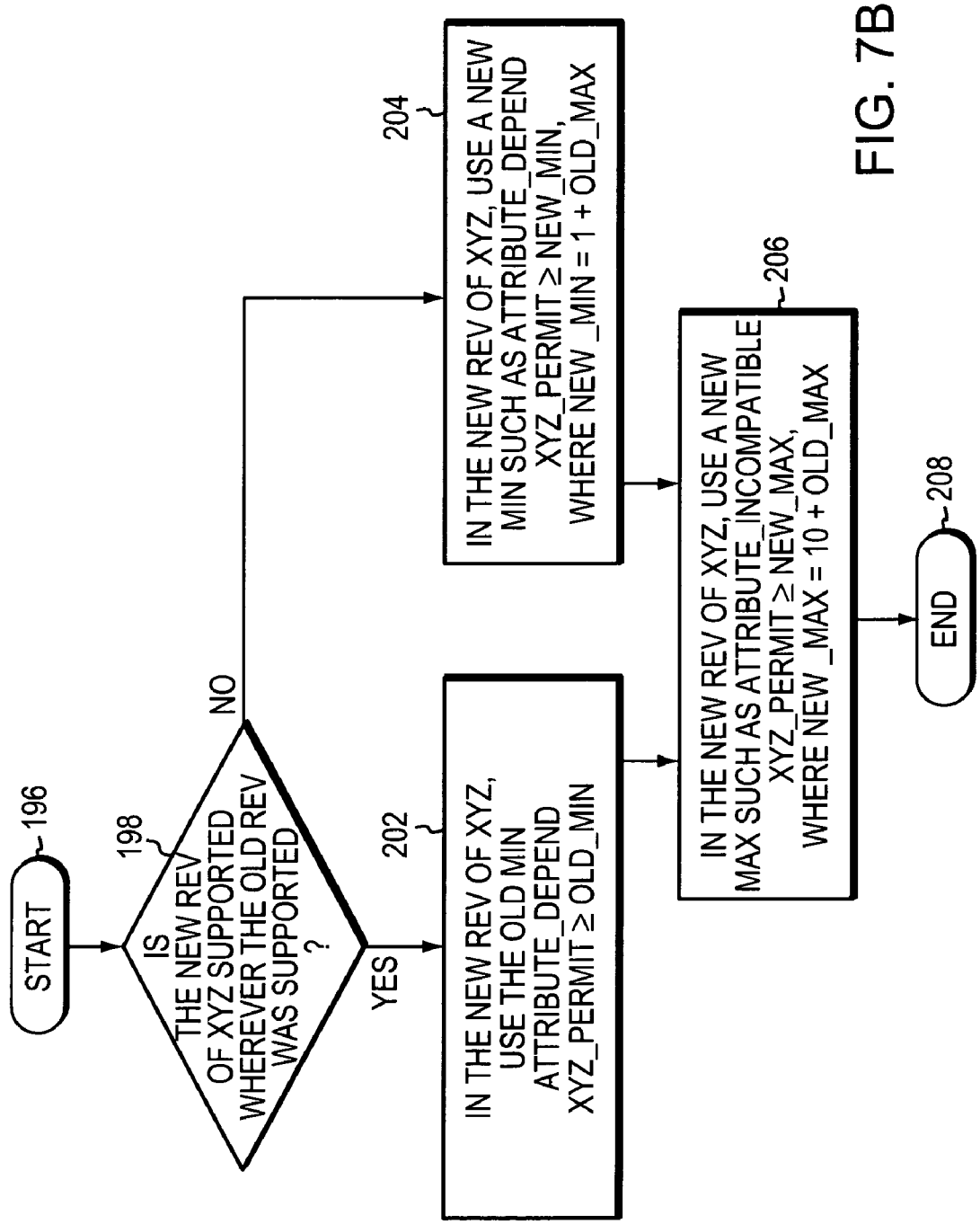

METHOD AND SYSTEM FOR MANAGING INSTALLATION OF SOFTWARE ON A COMPUTER SYSTEM PLATFORM

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to software installation, and more specifically to an method and system for installing software on a computer system platform.

RELATED CASES

This application is related to co-pending U.S. patent application Ser. No. 11/096,029 entitled "Architecture and Apparatus for Managing Installation of Software on a Computer System Platform" by Vook, et al filed on even date with this application, and is assigned to EMC Corporation, the same assignee as this invention.

BACKGROUND OF THE INVENTION

As is known in the art, computer systems generally include a platform generally comprised of a certain hardware base, including a central processing unit and computer memory, an operating system, and application or utility software that runs on top of the operating system.

Some software is only applicable to certain hardware platforms for various reasons. It may not be supported at all, it may not be qualified yet, or the hardware may be missing some required feature. This applicability for a given platform may change over time, as, for example, qualification testing is completed on that platform. There is a benefit to a company to re-use software across platforms when possible, to reduce manufacturing, testing, support and development costs. It is useful to be able to introduce new hardware platforms without revising all the applicable software for that new platform. It is not possible at the time of creation of software to know which future platforms will exist or which ones will support that software. The checks built-in to the software are fixed at the time it is released, so they cannot take into account names or other specific details about future platforms. It would be advancement in the art to provide a way to allow a way for installing software that isn't known when a certain platform is released, or vice-versa.

SUMMARY OF THE INVENTION

To overcome the problems and provide the advantages that have been described above, the present invention in one embodiment is a system or a method for installing software on a hardware platform that includes permits for installation while the software itself has attributes related to the permits and which are checked against the permits.

In still another embodiment a computer program product with program logic configured for performing steps described with reference to the method embodiment.

BRIEF DESCRIPTION OF THE DRAWINGS

The above and further advantages of the present invention may be better understood by referring to the following description taken into conjunction with the accompanying drawings in which:

FIG. 7B is another flow logic diagram showing certain aspects involved in carrying method steps involved with a method embodiment of the present invention.

DETAILED DESCRIPTION OF THE PREFERRED EMBODIMENT

Figure 1:
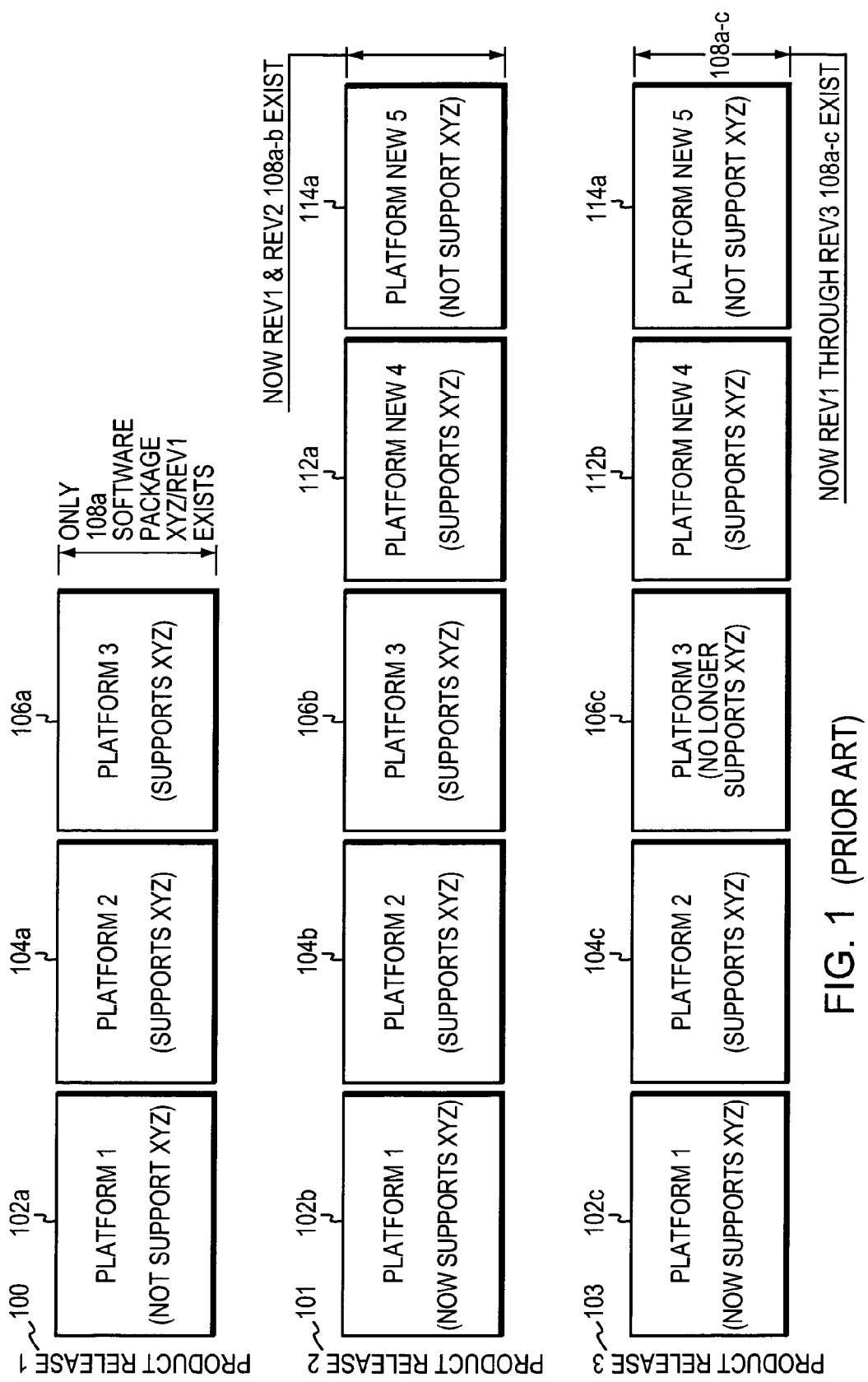
FIG. 1 is a schematic diagram of hardware platforms and software existing in a prior art configuration in which software installation included problems overcome by the present invention, embodiments of which are depicted in FIGS. 3-7.

The methods and apparatus of the present invention are intended for use in computer systems and may be implemented in data storage systems, such as the Clariion Disk Array system available from EMC Corporation of Hopkinton, Mass. and in particular are useful for installation of software on hardware platforms as either the software or hardware change over time.

Overview

An objective of the present invention is to allow software installation on current and future hardware platforms without requiring re-release of that software. Accordingly, in one embodiment the invention includes a method to mark software packages with permit dependencies that control the environments where the package may be installed. Current and future platforms can conditionally supply permits (hereafter PERMITS or PERMIT) to satisfy those dependencies. The PERMITS are delivered in hardware-specific software which must be produced for each new hardware platform. The PERMITS can also be changed when the hardware-specific software is re-created for a new release.

A prior approach to software distribution involved checks in the software packages that looked for specific hardware platform values. These checks would have to be modified to allow the packages to be installed on future platforms. An alternative would have been that any new platforms introduced later would have to support the existing software packages as written. Either way was costly and inflexible. The problems were aggravated as more types of software were introduced.

Without the present invention, generally, a software package contains a list or table of supported hardware platforms (and perhaps also excluded platforms). That package only installs on those supported platforms. A drawback of the prior art approach is that packages cannot accommodate new platforms easily. Usually the result is a proliferation of packages to accommodate new platforms, so there are multiple packages that do almost the same thing and greater production cost and complexity for the customer.

An advantage provided by the invention is some flexibility to introduce new platforms that allow or disallow use of any particular software package that may be already released. A further advantage is discontinuing support for any already-released software packages on current hardware models can be implemented, for example, to require an upgraded version of the software package. Another advantage is that there may be support for dependencies and PERMITS based on other software being present or absent from the system. That is, the support in such a case doesn't have to be tied to hardware changes.

Other advantages of the present invention, which uses PERMITS, is that generally there can be lower production cost for most packages, additional versions of software packages are produced only when required, i.e., not to manage the ability to be installed on a particular hardware platform. Less testing and tracking of various software versions and platform versions is required when the PERMITS are employed because no additional versions of a software package are needed to support a new platform. On the other hand it is relatively easy to make existing versions of a software package obsolete to force an upgrade for whatever reason may be driving such a motivation.

In a new method embodiment of the invention, the software packages check for PERMITS. Generally, PERMITS are an abstraction for representing that the platform is acceptable for the package, or stated another way that the platform supports the package because it has the right PERMIT. PERMITS may be optionally supplied by other packages for the platform, and these new PERMITS can be used to allow future platforms to be acceptable or not.

In this method embodiment, package installation control is now based on PERMITS instead of a list of platforms. For example, Software Package XYZ looks for its own PERMIT, wherein the Package includes its own ATTRIBUTES that are related to the PERMIT. In this example, Package XYZ might have the following attribute information: (i) ATTRIBUTE_DEPEND PACKAGE_XYZ_PERMIT$\geq$1; and (ii) ATTRIBUTE_INCOMPATIBLE PACKAGE_XYZ_PERMIT$\geq$10. In this case if the proper PERMIT is present, depending on the numerical value of the PERMIT and those dependencies on the Package, it may be installed. It is a good choice to supply PERMITS in the base package of software, wherein base package refers to core software for that hardware platform.

Example of a Problem Configuration Without the Invention

FIG. 1 shows details of a configuration in which the invention would be useful for overcoming some of the problems that are illustrated by this configuration. The configuration is an example to illustrate problems that the present invention is aimed toward overcoming. This configuration is not intended to limit the invention, which should be limited only by the claims appended hereto and their equivalents.

Figure 2A:
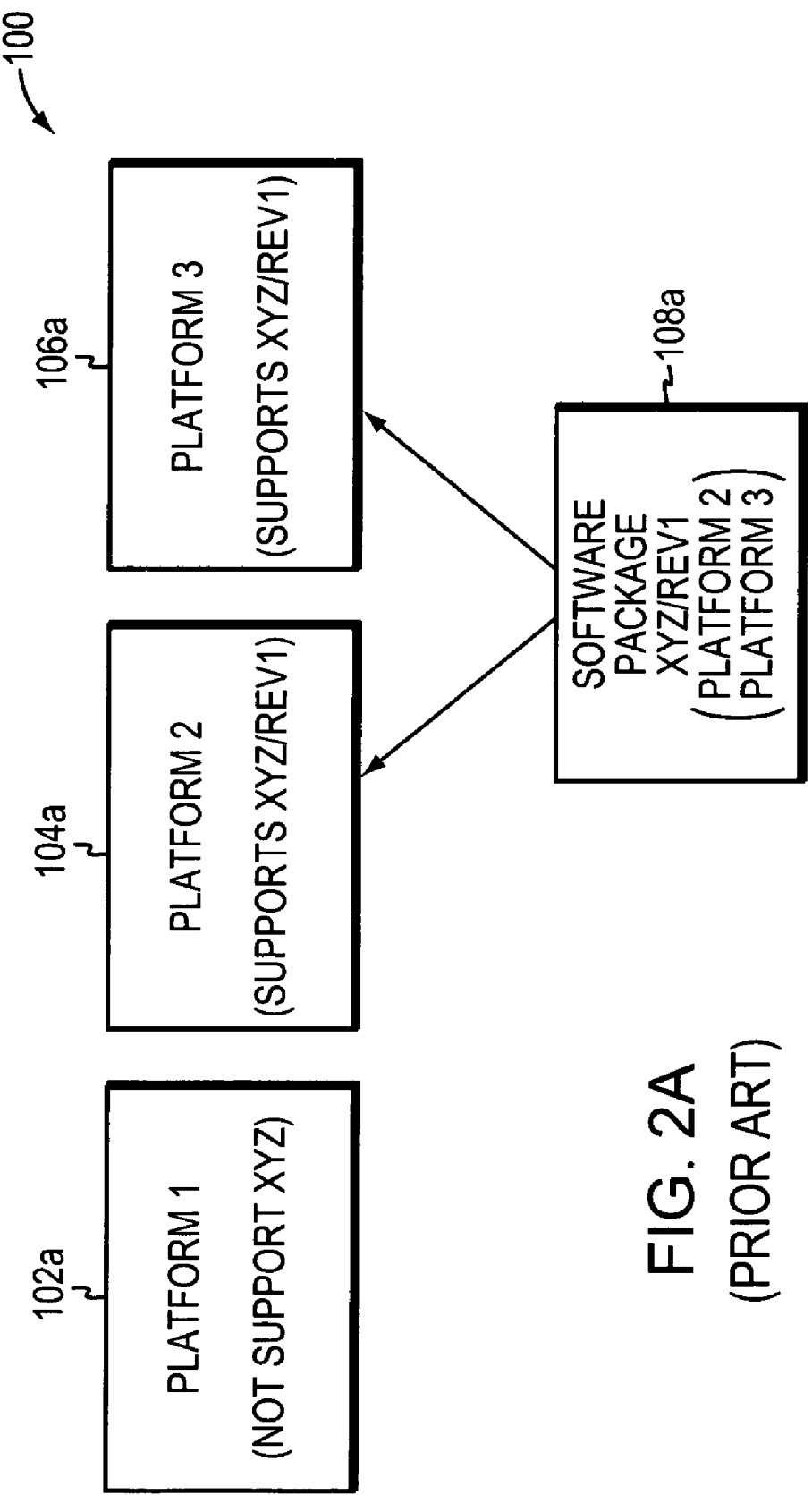
FIG. 2A is another schematic showing details of a product release referenced in FIG. 1.
Figure 2B:
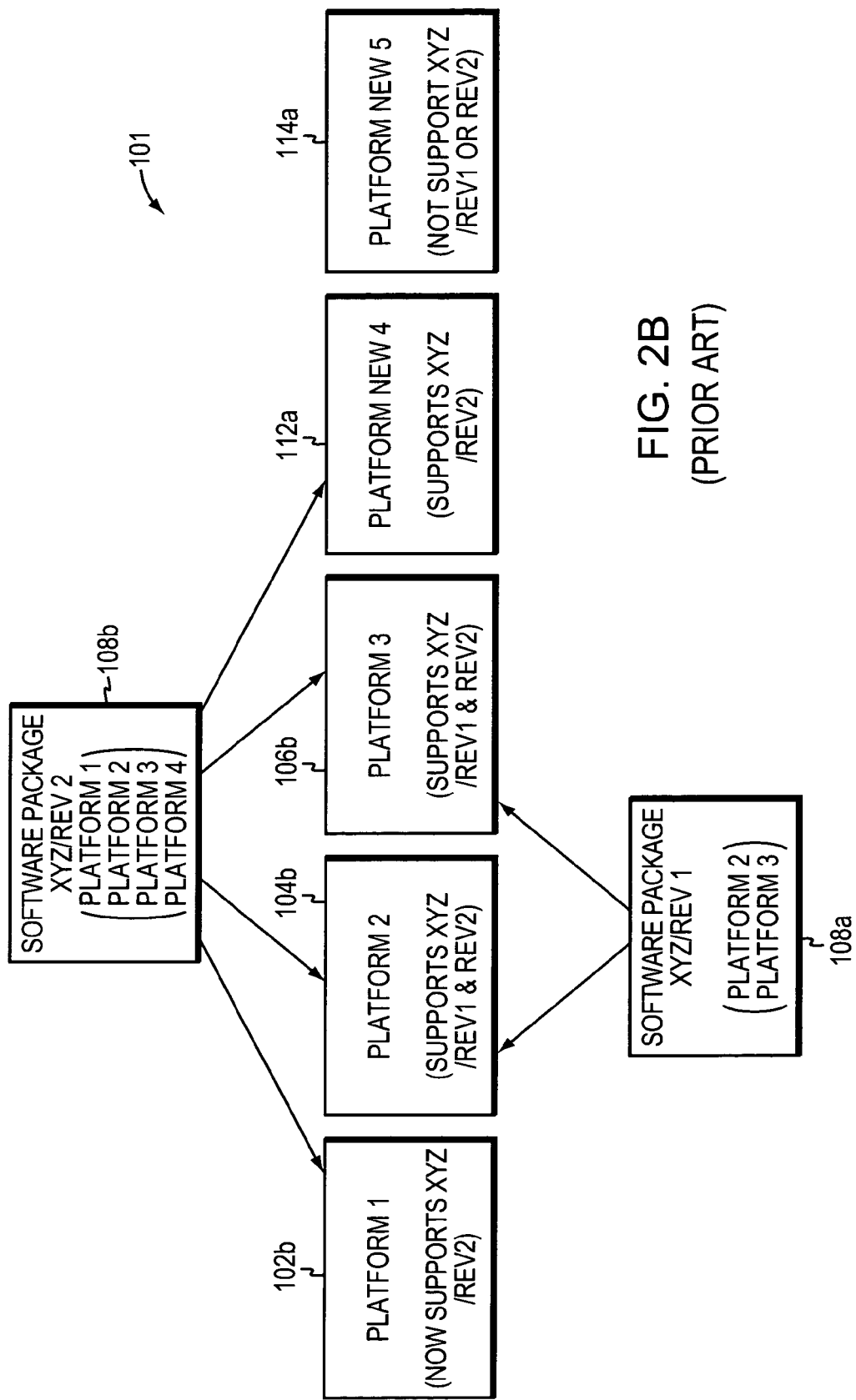
FIG. 2B is another schematic showing details of another product release referenced in FIG. 1.
Figure 2C:
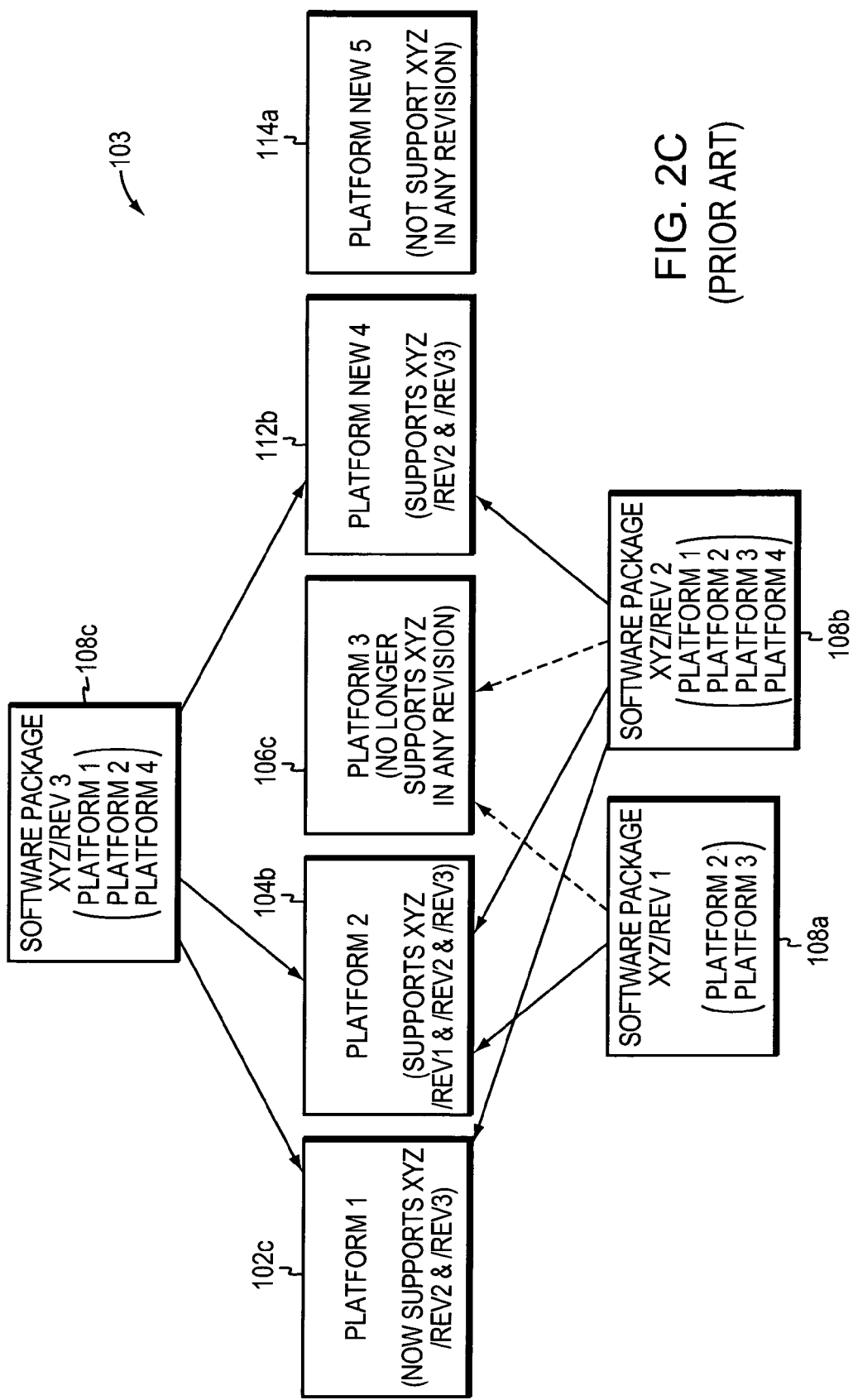
FIG. 2C is another schematic showing details of another product release referenced in FIG. 1.

In order to better understand the compilation shown in the overview chart of FIG. 1, reference also to FIGS. 2A-2C will be helpful. Each Product Release shown includes certain hardware platforms and certain software packages that exist at the time of a Product Release. Product Release 1 (100) includes three platforms (102a, 104a, and 106a) and one software package 108a, but not every platform supports the software and some complexity and overhead exists because of that situation. Product Release 2 (101) includes five platforms (102b, 104a, 106a, 112a, and 114a) and two software packages 108a-b, but, as before, not every platform supports each software package, and some support situations have changed since Product Release 2, creating further complexity and cost. Finally Product Release 3 (103) includes five platforms and three software packages and not every platform supports every package, creating still further complexity and cost. Details regarding this example cases is given below in FIGS. 2A-2C.

FIGS. 2A-2C show details about the exemplary configuration illustrated in FIG. 1.

FIG. 2A shows details related to Product Release 1 (100) that supports software package XYZ/Revision 1 (XYZ/Rev1) 108a on Platforms 2 (104a) and 3 (106a) only. In this prior art configuration, a list of supported platforms is logically embedded in package XYZ and checked at install time. Here Platform 2 and Platform 3 make up the list since those are the only platforms currently supported for XYZ/Rev1. Platform 1 (102a) is not supported so it does not appear in the supported list, and may also be included on an excluded list.

Regarding terminology XYZ/Rev1, for example, refers to software package XYZ at Revision 1 level, and similarly XYZ/Rev2, refers to software package XYZ at Revision 2 level. This type of nomenclature is used throughout to refer to different progressive levels of exemplary software package XYZ, with reference to FIGS. 2A-C and also FIGS. 4A-D, below. Further regarding terminology when a reference numeral and letter combination, such as 102a is assigned to a Platform such as Platform 1, the reference letter progresses to the next letter in the alphabet, such a 102b, to indicate a change has occurred on that Platform. A change typically means that support for a particular software package has changed on a particular platform. When a reference number is used again in subsequent figures then it refers to the identical element in all the figures, and this practice is consistent throughout this document. This practice for terminology and reference letters is consistent throughout this document.

FIG. 2B shows details related to Product Release 101 that adds support for software Package XYZ/Rev2 (108b) on Platform 1 (102b), but XYZ/Rev1 is not supported on that Platform (for purposes of this discussion a Product includes the software Package and the hardware Platform). New Platform 4 (112a) and New Platform 5 (114a) are introduced with the Product Release 2 (101). Platform 4 supports XYZ/Rev2 (108b) but not XYX/Rev1 (108a). Platform 5 does not support either XYZ/Rev1 or XYZ/Rev2. Platform 2 and Platform 3 (104b and 106b, respectively) both support XYZ/Rev1 and XYZ/Rev2. Another way to state that is XYZ/Rev2 software package supports Platforms 1, 2, 3, and 4 but not Platform 5. In either case, lengthy lists or tables must be provided to check for these requirements in the software and such a list may also be present in the Platforms (if for example, such include operating systems or other code associated with the hardware). This is costly.

Also, disadvantageously, the XYZ/Rev1 package must be re-released as Rev 2 to accommodate the new qualified platforms. Here the list in package XYZ is be updated to include Platforms 1, 2, 3, and 4. Release 2 must be qualified with Rev1 and Rev 2 of Package XYZ on most platforms. That involves testing and documentation, which adds cost to the Product. Rev 1 of XYZ still works on Platform 2 and Platform 3. That can add extra cost if XYZ needs to be fixed and further revisions to lists and qualifications are required to accommodate for such a change.

FIG. 2C shows details related to Product Release 3 (103). In this example, support for XYZ in any revision is withdrawn on Platform 3 (106c) in Release 3 because of some serious problems. Release 3 which includes upgraded software XYZ/Rev3 (108c) would support Platform 1 (102c), Platform 2 (104c), and Platform 4 (112b) but neither Platform 3 (106c) nor Platform 5 (114a). The XYZ package must be released again as XYZ/Rev3 to continue support for Platforms 1, 2 and 4. But Platform 4 supports XYZ/Rev2 and XYZ/Rev3 only, while Platform 5 does not support any revision of XYZ. Here the list in package XYZ/Rev 3 must be updated to include only Platforms 1, 2, and 4. Release 3 must be qualified with Rev1, 2 and 3 of Package XYZ on most platforms. All this complexity, adds extra cost. Customers with Platform 3 must be forced to not use existing XYZ/Rev1 (108a), XYZ/Rev2 (108b), nor new XYZ/Rev3 (108c). Somehow these restrictions must be policed (notices, lists, and the like may be used). Again the complexity increases costs in this prior art example.

Preferred Embodiment Including Permits

Figure 3:
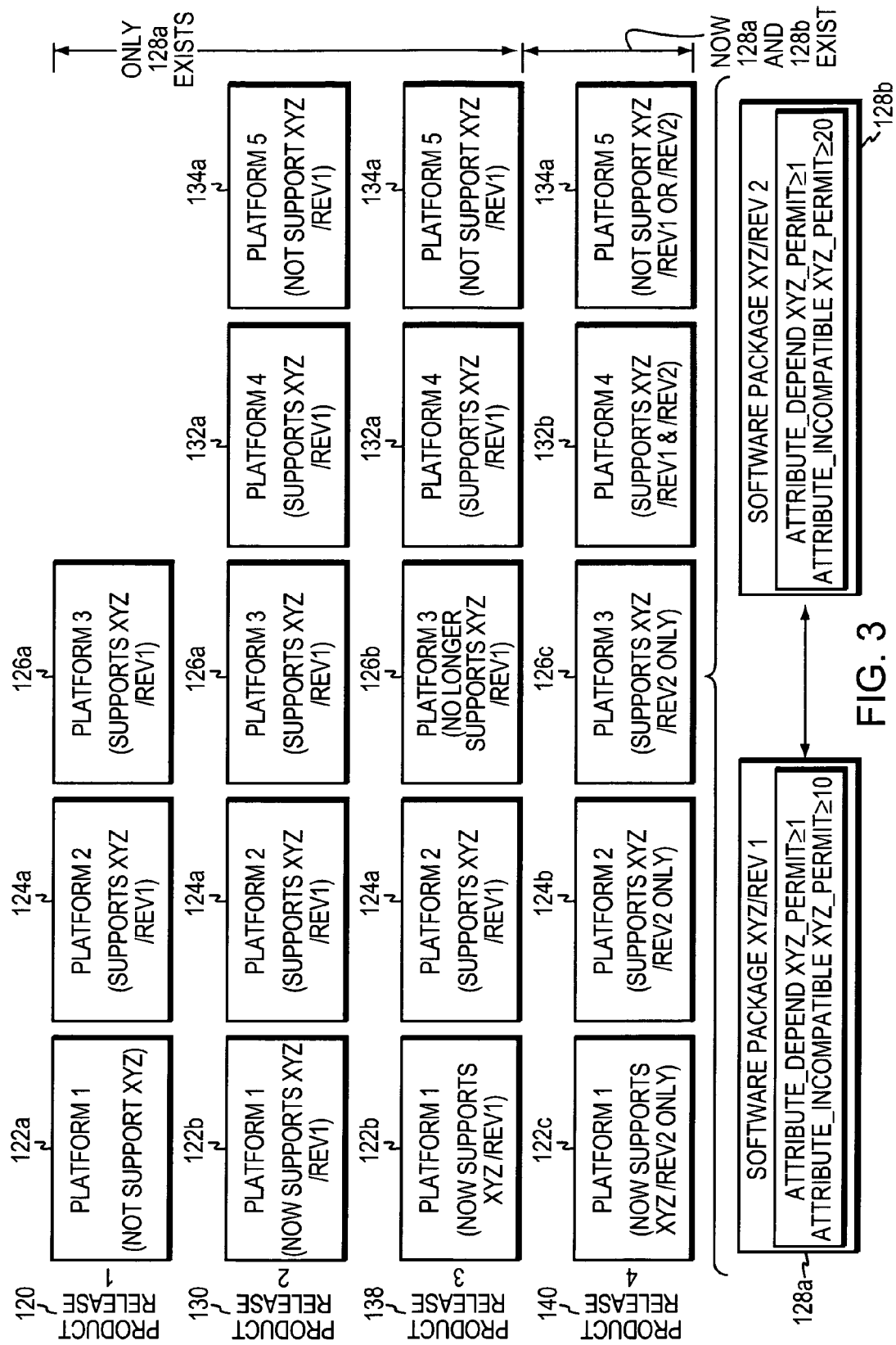
FIG. 3 is a schematic diagram of hardware platforms and software existing in a new configuration embodying certain aspects of the present invention for software installation and in which embodiment some problems illustrated by the prior art configuration of FIG. 1 are overcome.
Figure 4A:
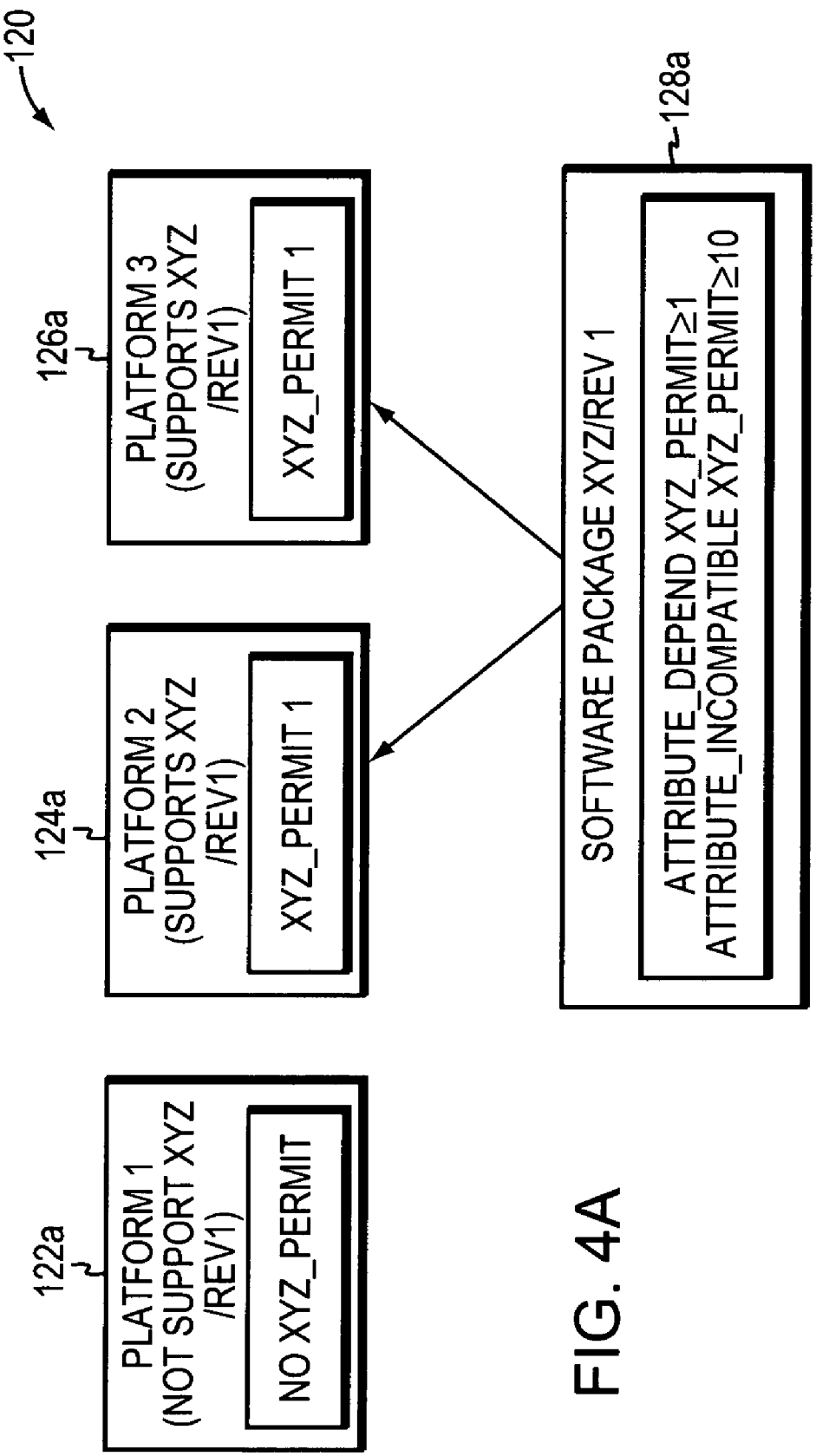
FIG. 4A is another schematic showing details of a product release referenced in FIG. 3.
Figure 4B:
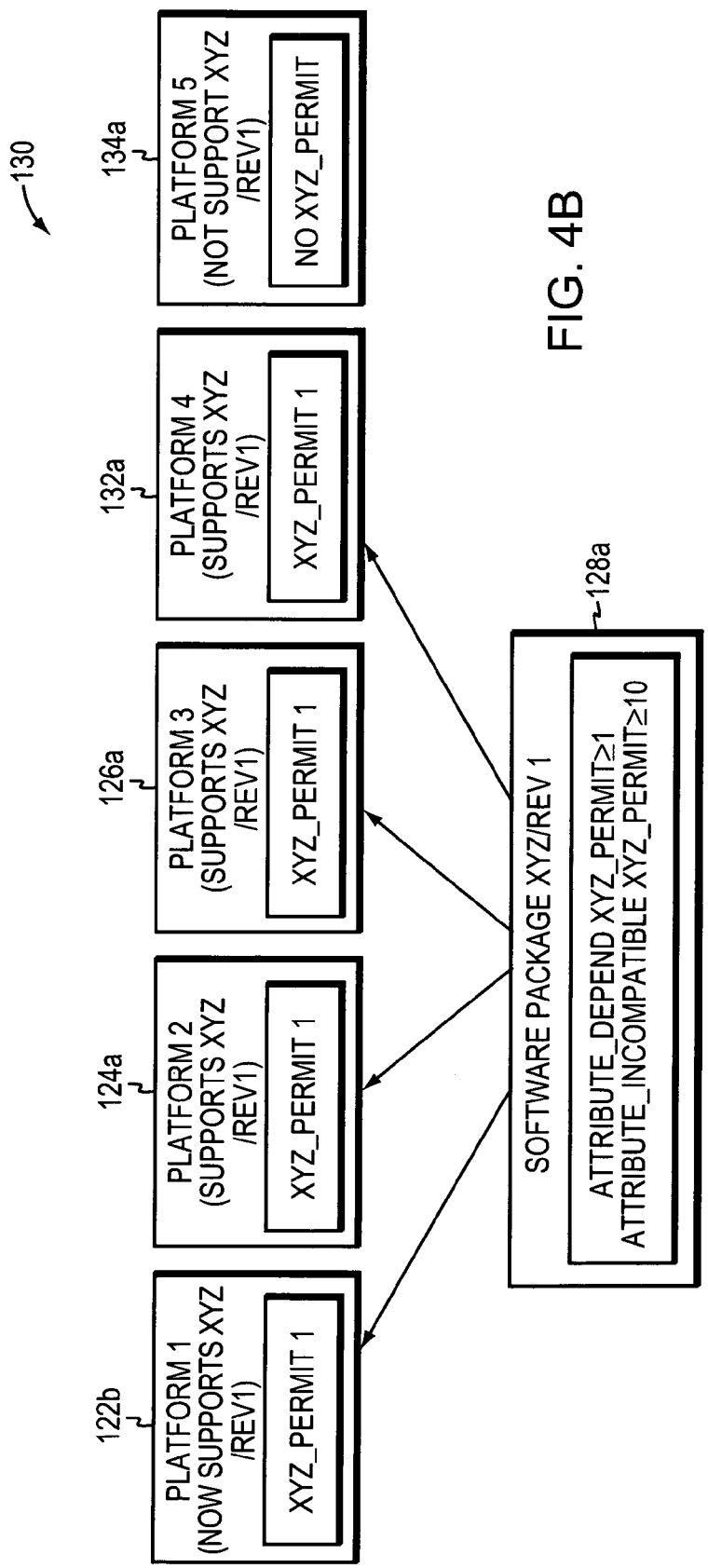
FIG. 4B is another schematic showing details of another product release referenced in FIG. 3.
Figure 4C:
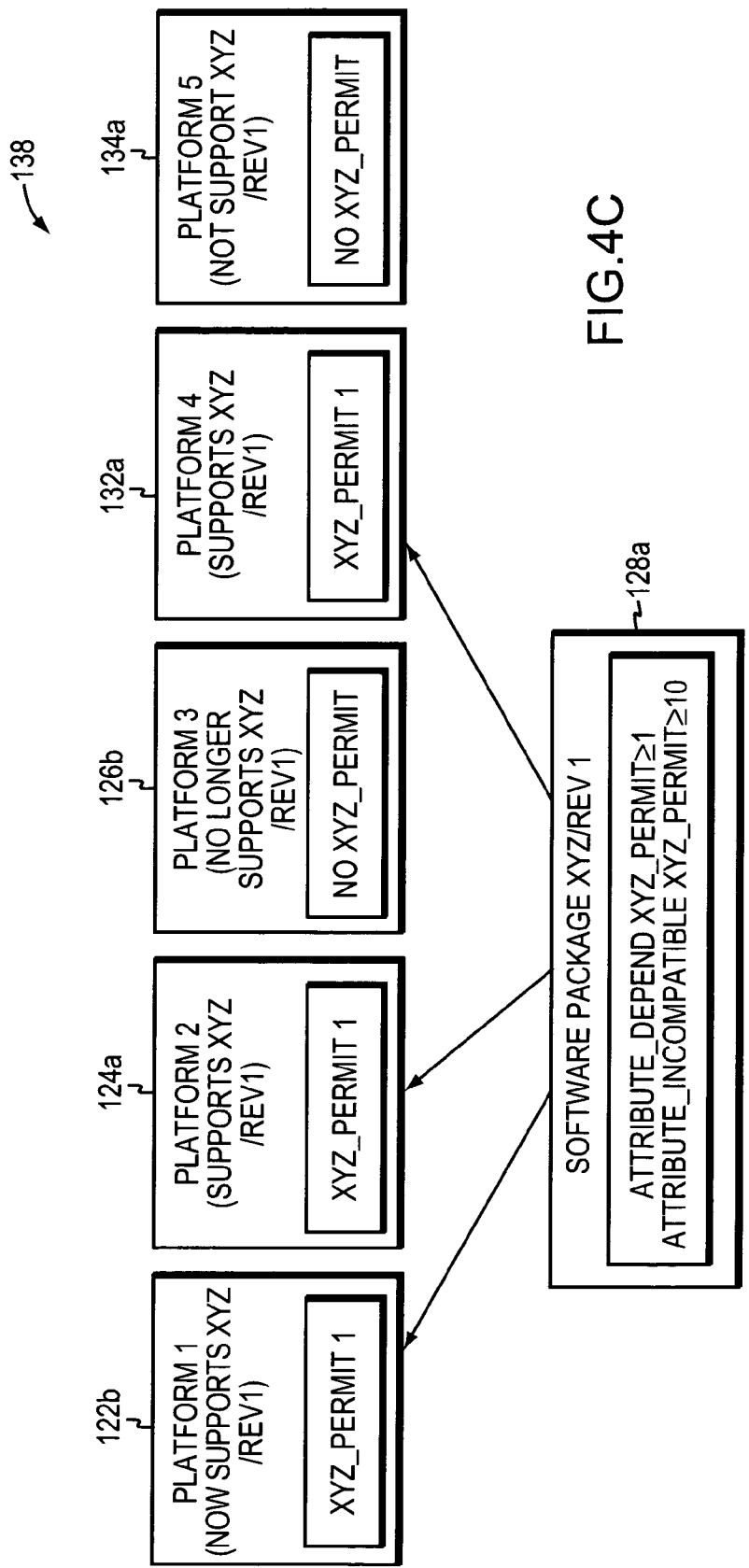
FIG. 4C is another schematic showing details of another product release referenced in FIG. 3.
Figure 4D:
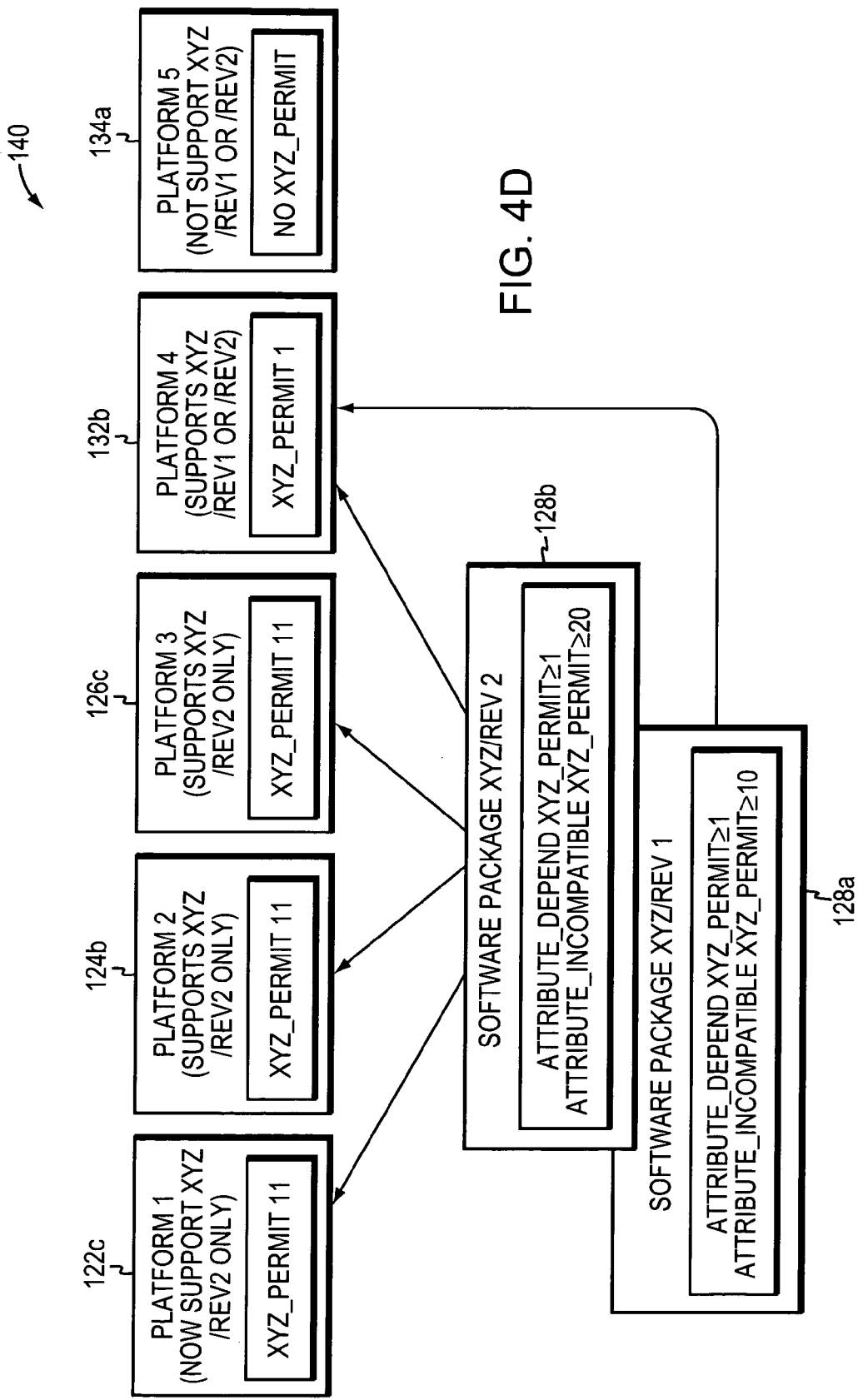
FIG. 4D is another schematic showing details of another product release referenced in FIG. 3.

FIG. 3 shows details of a configuration in which the invention is useful for overcoming problems similar to those that had been discussed with reference to FIGS. 1 and 2A-C. In order to better understand the compilation shown in the overview chart-type schematic of FIG. 3, reference to FIGS. 4A-D will be helpful. FIG. 4A shows details related to Product Release 1 (120) that supports XYZ/Rev1 (128a) on Platform 2 (124a) and Platform 3 (126a), but not on Platform 1 (122a). FIG. 4B shows details related to Product Release 2 (130). In this example case, support for XYZ/Rev1 is now added on Platform 1 (122b). It is also present on new Platform 4 (132a) and remains on Platform 2 (124a) and Platform 3 (126a). FIG. 4C shows details related to Product Release 3 (138). In this example case, support for XYZ/Rev1 (128a) on Platform 3 (126b) is withdrawn in Release 3 because of some serious problems. Release 3 supports Platform 1 (122b), Platform 2 (124a), and Platform 4 (132a) but neither Platform 3 (126b) nor Platform 5 (134a). FIG. 4D shows details related to Product Release 4 (140). In this example case, product XYZ is enhanced in XYZ/Rev2 (128b) and support for the older revision is being discontinued on all but Platform 4 (132b). Customers must either upgrade package XYZ to XYZ/Rev2, or uninstall their XYZ/Rev1 version, except on Platform 4. In this example case, problems on Platform 3 (126c) are resolved, and XYZ/Rev 2 is supported there. In Release 4, the XYZ_PERMIT is given a new value of 11 where XYZ/Rev 2 only is supported, i.e., on Platform 1 (122c), Platform 2 (124b), and Platform 3 (126c).

Regarding terminology XYZ/Rev1 and Platform 1, for example, are used in a similar way as with FIGS. 1 and 2A-C, as the elements are of the same type (software packages, and hardware platforms, respectively). However, in FIGS. 3, and 4A-D those elements refer to different elements than in the earlier figures, and hence are designated with new reference numbers. So for example Platform 1 (102a) of FIG. 1 is not the same as Platform 1 (122a) of FIG. 4A but both represent hardware platforms. Likewise XYX/Rev1 (128a) of FIG. 3 is not the same as XYZ/Rev1 (108a) of FIG. 1, but both refer to software packages at the first level of revisions. Progression of reference numeral and letter combination by incrementing to the next alphabetical sequence is handled the same on FIGS. 3-4A-D as is has been handled with FIGS. 1-2A-C.

FIG. 4A shows details related to Product Release 1 (120) that supports XYZ/Rev1 (128a) on Platform 2 (124a) and Platform 3 (126a), but not on Platform 1 (122a). Each hardware platform has its own base package which contains platform-specific code and settings. Each platform has a new base package for each product release. The base package for a given platform provides PERMITS applicable for that platform in that release. In Release 1, the XYZ_PERMIT is given a value of 1 where XYZ is supported, i.e., on Platforms 2 and 3. The XYZ_PERMIT is not present in the base software package for any platform where XYZ is not supported, e.g. Platform 1. The XYZ package contains expressions that define the values for the XYZ_PERMIT that will allow installation on the current platform. ATTRIBUTE_DEPEND indicates the expression must be TRUE to allow installation. ATTRIBUTE_INCOMPATIBLE indicates the expression must be FALSE to allow installation. Both of these attribute values and their requirements are shown in the related expression in XYZ/Rev1 (128a).

FIG. 4B shows details related to Product Release 2 (130). In this example case, support for XYZ/Rev1 is now added on Platform 1 (122b). It is also present on new Platform 4 (132a) and remains on Platform 2 (124a) and Platform 3 (126a). But new Platform 5 (134a) does not support XYZ/Rev1, and it is the only Platform in Product Release 2 that carries NO XYZ_PERMIT. All the other Platforms 1-4, carry XYZ-PERMIT 1, which satisfies the attribute dependencies requirement in XYZ/Rev1 (128a). The base package for a given platform provides PERMITS applicable for that platform in that release. In Release 2, the XYZ_PERMIT is given a value of 1 where XYZ is supported in that release, i.e., on Platforms 1, 2, 3 and 4. Though created before Platforms 4 and 5 were known, the XYZ package at level XYZ/Rev1 still does not need to be re-released. Qualification costs are lowest, and customer convenience is the greatest when compared to the prior art.

FIG. 4C shows details related to Product Release 3 (138). In this example case, support for XYZ/Rev1 (128a) on Platform 3 (126b) is withdrawn in Release 3 because of some serious problems. Release 3 supports Platform 1 (122b), Platform 2 (124a), and Platform 4 (132a) but neither Platform 3 (126b) nor Platform 5 (134a). Accordingly, in Release 3, the XYZ_PERMIT is given a value of 1 where XYZ is supported in that release, i.e., on Platforms 1, 2, and 4. Additionally, the XYZ_PERMIT is removed from the base on Platform 3 since XYZ is no longer supported on that platform for now (NO XYZ_PERMIT). Similarly, the XYZ_PERMIT continues not to be available on Platform 5 indicating that XYZ/Rev1 cannot be installed. Though created before Platforms 4 and 5 were known and before the problem on Platform 3 was seen, the XYZ package still does not need to be re-released.

FIG. 4D shows details related to Product Release 4 (140). In this example case, product XYZ is enhanced in XYZ/Rev2

(128b) and support for the older revision is being discontinued on all but Platform 4 (132b). Customers must either upgrade package XYZ to XYZ/Rev2, or uninstall their XYZ/Rev1 version, except on Platform 4. In this example case, problems on Platform 3 (126c) are resolved, and XYZ/Rev 2 is supported there. In Release 4, the XYZ_PERMIT is given a new value of 11 where XYZ/Rev 2 only is supported, i.e., on Platform 1 (122c), Platform 2 (124b), and Platform 3 (126c). On Platforms 1, 2, and 3, this new PERMIT value will make the older revision of the XYZ/Rev1 (128a) software package obsolete and force upgrade or uninstall of package XYZ. On Platform 4, the XYZ_PERMIT maintains the value of 1 and will satisfy both XYZ/Rev1 and XYZ/Rev2. XYZ/Rev 2 is constructed to allow the new or old PERMIT values, so the minimum is set to 1. XYZ/Rev 1 of package XYZ will no longer be satisfied by the PERMITS present in Base, except for Platform 4 which still supports XYZ/Rev1, as well as XYZ/Rev2. Platform 5 (134a) carrying NO XYZ_PERMIT continues not to support XYZ/Rev1, nor will it support XYZ/Rev2.

Figure 5:
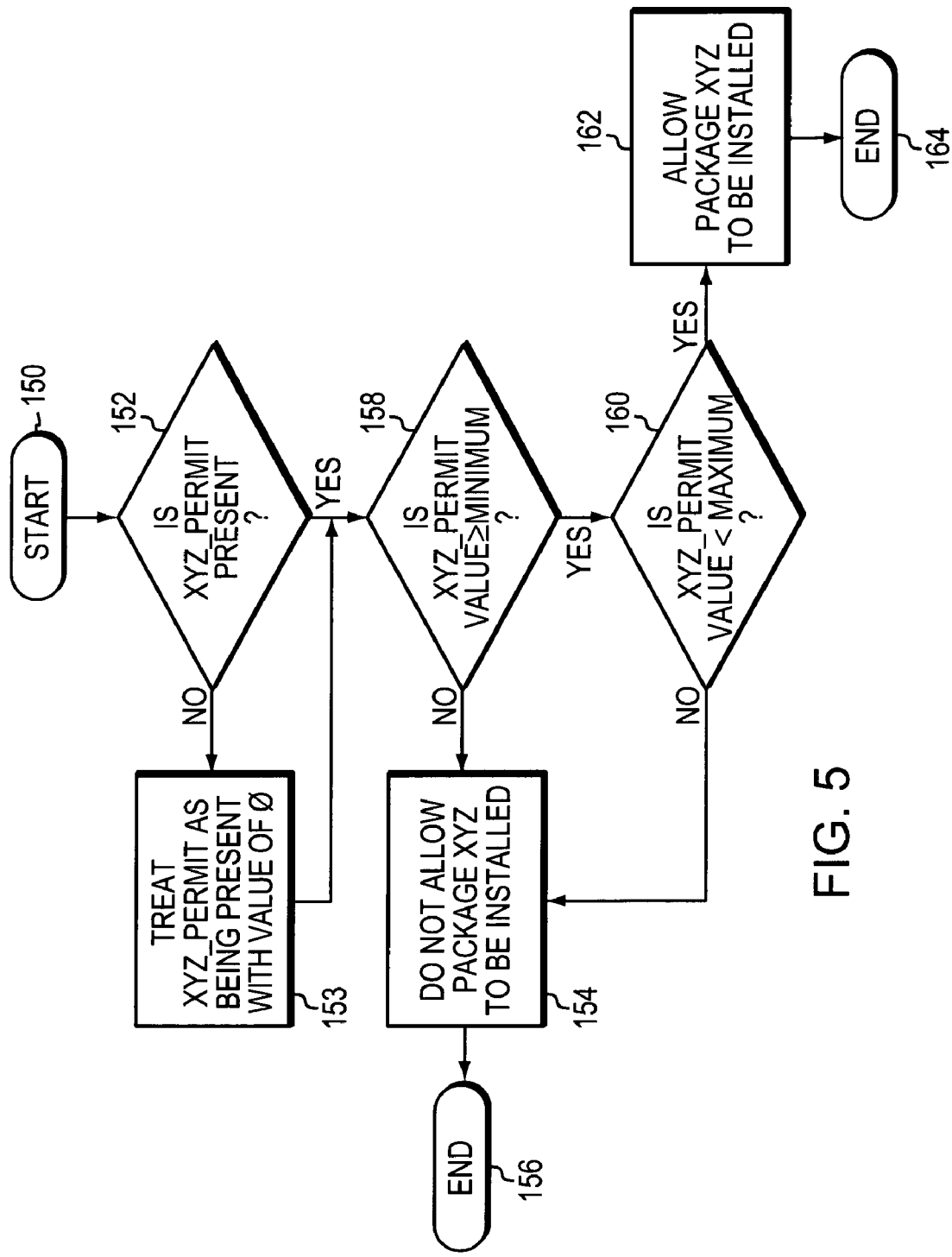
FIG. 5 is a flow logic diagram showing certain aspects involved in carrying out method steps involved with a method embodiment of the present invention.
Figure 6:
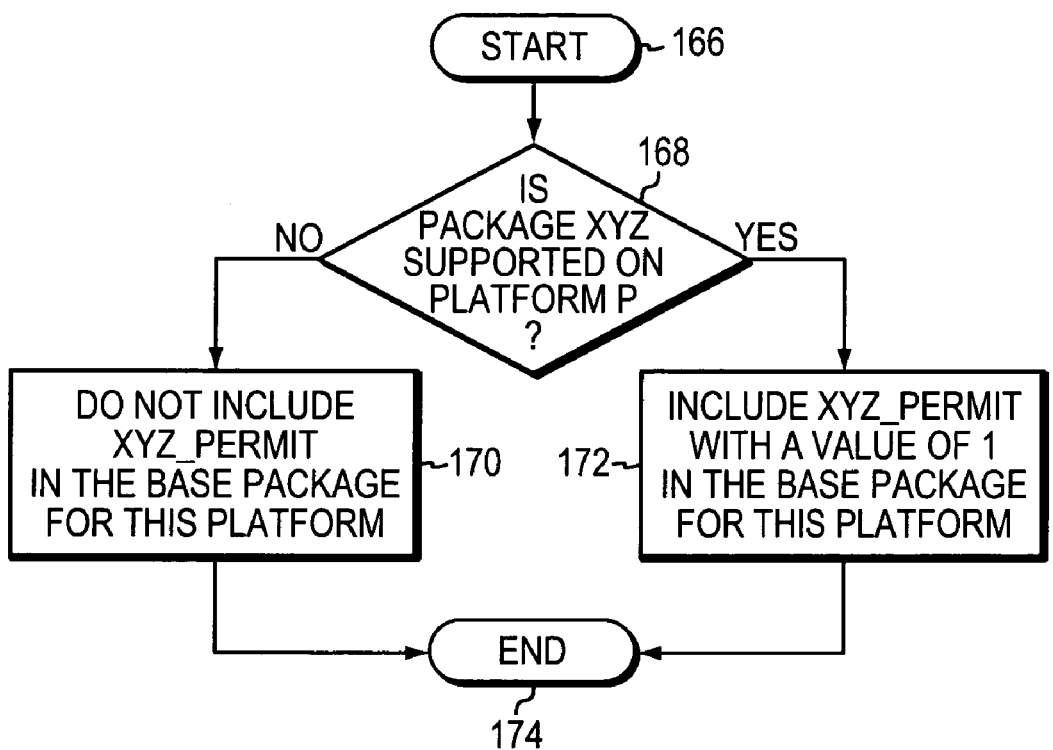
FIG. 6 is another flow logic diagram showing certain aspects involved in carrying method steps involved with a method embodiment of the present invention.

Reference is made to FIG. 5 in which method steps for carrying out a procedure for managing installation using PERMITS is now described. The process starts in Step 150. An inquiry is posed in Step 152 to determine whether XYZ_PERMIT is now present. If the answer is NO, then in Step 153, we treat the value of XYZ_PERMIT as zero for the rest of the process. In either case, the process continues in Step 158 where the value of XYZ_PERMIT is checked to determine if its value is greater than or equal to the minimum (VALUE≧MINIMUM). Recall in the example of XYZ/Rev1, this was handled by the attribute dependency, ATTRIBUTE_DEPEND XYZ_PERMIT≧1. If the answer to the query posed in Step 158 is YES, then still another query is posed in Step 160 to check for an incompatibility condition. Step 160 asks if XYZ_PERMIT has a value less than the maximum established in the attribute dependency for incompatibility of the software package (VALUE<MAXIMUM). Recall in the example of XYZ/Rev1, this was handled by the attribute dependency, ATTRIBUTE_INCOMPATIBLE XYZ_PERMIT≧10. If the answer is YES to query 160, meaning there was not an incompatibility, then in Step 162, the software package XYZ is allowed to be installed on the platform Referring to FIG. 6 a simple case is described that is helpful understanding implementing the invention in one embodiment. The process starts in Step 166. Step 168 poses a query to determine whether Package XYZ is supported on Platform P. If the answer is NO, then in Step 170 the XYZ_PERMIT is not included in the base package of Platform P. If on the other hand, the answer is YES, then in step 172 the XYZ_PERMIT is included with a value of 1 in the base package for Platform for P.

Figure 7A:
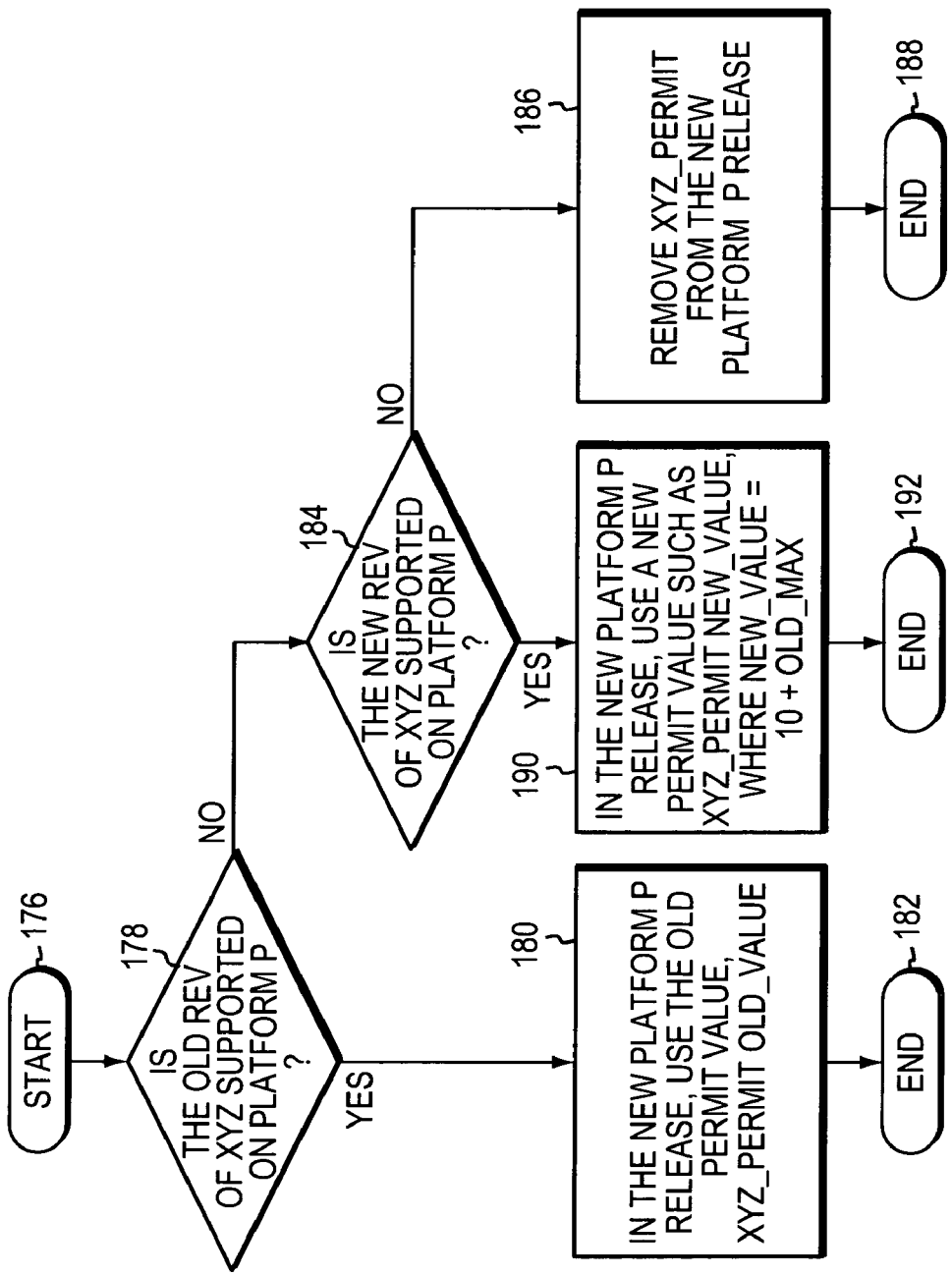
FIG. 7A is another flow logic diagram showing certain aspects involved in carrying method steps involved with a method embodiment of the present invention.

Reference is made to FIG. 7A, which shows steps to determine the XYZ_PERMIT values in the software for each Platform P in a new release. Assumptions: the prior rev of package XYZ contains ATTRIBUTE_DEPEND XYZ_PERMIT≧OLD_MIN; ATTRIBUTE_INCOMPATIBLE XYZ_PERMIT≧OLD_MAX; and the typical PERMIT for the Prior rev of XYZ is ATTRIBUTE XYZ_PERMIT OLD_VALUE, as in the example case shown in FIG. 4D. The process starts in Step 176. Step 178 determines whether the old revision of XYZ is supported on Platform P. If YES, then in Step 180, the old XYZ_PERMIT value allows old and possibly new revisions of XYZ to be installed on Platform P in this new release. However, the new rev of XYZ must work with the OLD_VALUE. If the new revision is supported on Platform P per the test in Step 184, then in Step 190 Permit values instruction is given. The new XYZ_PERMIT value allows a new revision of XYZ to be installed on Platform P in this new release. The new rev of XYZ must work with NEW_VALUE and can be constructed either to work with or not work with the OLD_VALUE. If it is not to be supported, then in Step 186, the instruction to remove the PERMIT means that the effect of a missing XYZ_PERMIT will be to block installation of any revision of XYZ on Platform P in this new release. Depending on the path followed, processing ends in step 182, 192, or 188.

Reference is made to FIG. 7B, which shows steps to instruct what dependencies should be built into a new revision of package XYZ if support is desired for the old revision. The assumptions are the same as in the case shown in FIG. 7A. The process starts in Step 196. Step 198 determines whether the new revision of XYZ is supported on Platform P when the older revision is also supported. If YES, then in Step 202, it is seen that the new rev of XYZ can be installed where the old rev was supported because the NEW_MIN is the same as the OLD_MIN. But if NO, then in Step 204, setting the values as shown in the step blocks the new revision of XYZ where the old revision is supported because the NEW_MIN is outside the range of the old revision of XYZ. Any XYZ_PERMIT that satisfies the old revision will not satisfy the new revision in such as case. Following the instruction in Step 206, The NEW_MAX must be greater than the NEW_MIN, but other than that, it won't affect the new revision of XYZ. In general it has more impact on future flexibility to disallow the old revision of XYZ while allowing or blocking the new revision of XYZ, depending on the future XYZ_PERMIT value chosen, but this is a choice for the user of the system and method described herein.

Figure 8:
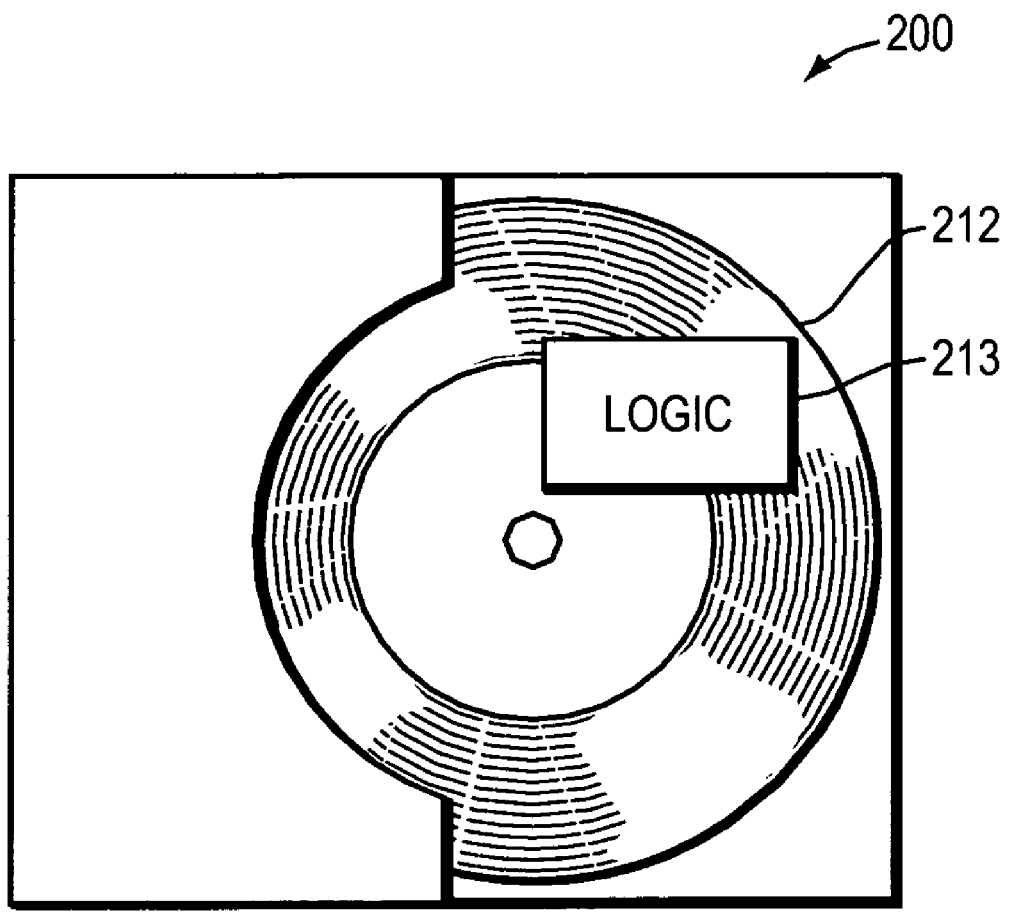
FIG. 8 is a computer program product including a computer-readable medium encoded with program logic capable of executing methodology described herein.

FIG. 8 shows a computer program product 200 including a computer-readable medium 212 encoded with computer program Logic 213 (software in a preferred embodiment). The Logic is configured for allowing a computer to execute the methodology described above. One skilled in the art will recognize that the Logic may also be loaded into conventional computer memory and executed by a conventional CPU. The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. Such may be implemented such that herein, when the program code is received and loaded into and executed by a machine, such as a computer, the machine becomes an apparatus for practicing the invention. When executed in a computer's memory by a processing unit, the logic reconfigures a general purpose digital computer into a special purpose digital computer enabled for carrying out the process and methodology discussed herein. When implemented on a general-purpose processor, the program code combines with the processor of the computer to provide a unique apparatus that operates analogously to specific logic circuits.

A system and method and computer program product has been described for managing one or more storage processors in a data storage environment from a single point of management. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A computer-implemented method for managing installation of a software package having a revision level on one or more computer hardware platforms, the method comprising:
   including a software attribute as part of the software package that is at a revision level;
   selectively including or not including a software permit as part of the computer hardware platform that has a value for which the attribute is related, wherein the software permit represents whether the computer hardware platform is acceptable for the software package;
   responsive to an attempt to install the software package at the revision level, determining if the software permit is present and not allowing installation of the software package if the software permit is not installed, and if the software permit is installed determining whether a relationship between the permit and the attribute denominated as a attribute permit relationship will allow installation of the software package at the revision level on the computer hardware platform, wherein the presence of the software permit allows installation of the software package on current and future versions of the computer hardware platform without requiring a re-release of the software package because of the attribute permit relationship and the attribute permit relationship can be used to allow discontinuing support of the software package at the revision level to force an upgrade of the software package to a different revision level; wherein the attribute permit relationship contains Permits that are an abstraction for representing that the platform is acceptable for the software package; wherein the software package looks for its own Permit, wherein the software package includes its own Attributes that are related to Permits; if the proper Permit is present, depending on a numerical value of the Permit and those dependencies on the software package, then the software package may be installed.

2. The method of claim 1, wherein the attribute has a dependency value related to the permit that combined with the permit determines the attribute permit relationship.

3. The method of claim 2, wherein the attribute has an incompatibility value also related to the permit and the dependency value and the incompatibility value combined with the permit determines the attribute permit relationship.

4. The method of claim 1, wherein if the software package is not supported then the installation of the software package on the computer hardware platform is not allowed.

5. The method of claim 4, wherein if the software permit is not included on the computer hardware platform then the attribute permit relationship is not supported and the installation of the software package on the computer hardware platform is not allowed.

6. The method of claim 5, wherein the attribute has a dependency value related to the permit that combined with the permit determines the attribute permit relationship and if the dependency value is not satisfied by the attribute permit relationship then the installation of the software package on the computer hardware platform is not allowed.

7. The method of claim 6, wherein the attribute has an incompatibility value also related to the permit and the dependency value and the incompatibility value combined with the permit determines the attribute permit relationship and if the incompatibility value is satisfied then the installation of the software package on the computer hardware platform is not allowed.

8. The method of claim 7, wherein the dependency value is not satisfied when the attribute permit relationship does not satisfy a mathematical relationship defined in the dependency value.

9. The method of claim 8, wherein the incompatibility value is satisfied when the attribute permit relationship does satisfy a mathematical relationship defined in the dependency value.

10. The method of claim 7, wherein the dependency value and incompatibility value are used to allow support for more than one revision level of the software package.

* * * * *